Jan. 6, 1959
J. G. INGRES
2,867,307
BOOSTER BRAKE MECHANISM
Filed Feb. 10, 1954
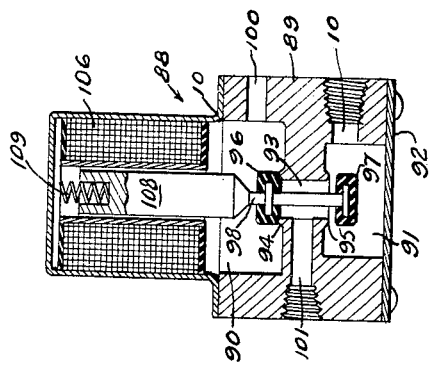
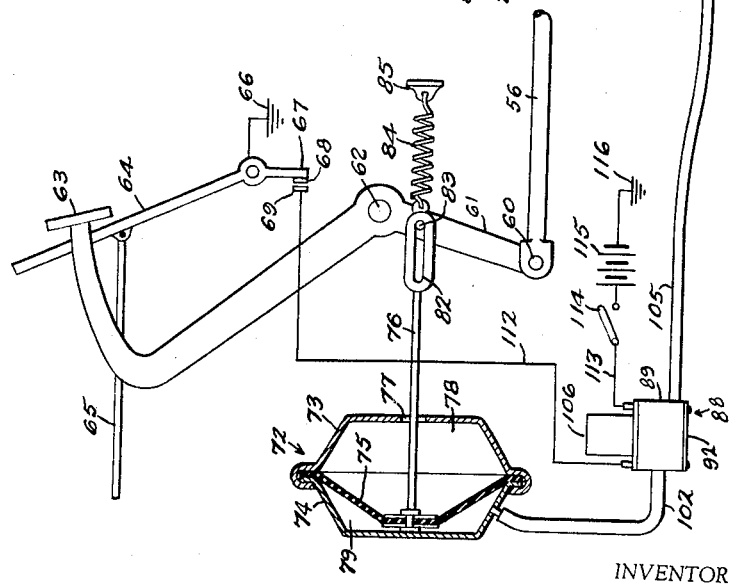
INVENTOR
JEANNOT G. INGRES
BY John F. Phillips
ATTORNEY

United States Patent Office 2,867,307
Patented Jan. 6, 1959

2,867,307

BOOSTER BRAKE MECHANISM

Jeannot G. Ingres, Dearborn, Mich., assignor to Kelsey-Hayes Company, a corporation of Delaware Application February 10, 1954, Serial No. 409,337

12 Claims. (Cl. 192—3)

This invention relates to booster brake mechanisms.

Booster mechanisms are now in common use on motor vehicles, and all manufacturers desire brake mechanisms of this type to be provided with "soft" pedals. In other words, it is the desire of manufacturers to provide a booster brake mechanism having an operating pedal or treadle which is movable from its normal off position with a minimum of effort. As a result, movement of such a pedal or treadle initially takes place solely against the resistance of relatively light biasing means.

Moreover, particularly with the advent of automatic transmissions, it has become wholly practicable to operate the motor vehicle accelerator pedal with the right foot and to operate the brake pedal with the left foot. With the advent of low treadles for operating the brakes, made possible by booster brake mechanisms, it has become the increasing practice in the operation of motor vehicles for the operator to rest his left foot on the brake treadle. Because of the light resistance to movement of the pedal from normal off position, the pedal will move appreciably under merely the weight of the operator's foot, thus resulting in a light application of the brakes.

An important object of the present invention is to provide a novel brake pedal control mechanism which functions to substantially resist movement of the brake pedal from the normal off position while the accelerator pedal is being used in the driving of the vehicle, and to release such added resistance on the brake pedal to provide for its normal operation whenever the accelerator pedal is permitted to move to its idling position.

A further object is to provide such a device having an auxiliary motor connected to the brake pedal or treadle and to energize this motor to provide added force tending to hold the brake treadle in normal off position whenever the accelerator pedal is depressed from idling position, thus permitting the operator to rest his foot on the brake treadle without effecting any brake application, and to provide for the de-energization of the auxiliary motor whenever the acelerator pedal is in normal off position.

A further object is to provide an auxiliary motor of the type referred to, operable by the same source of pressure differential which is utilized for energizing the booster motor whereby, upon a failure of power in the booster motor, the auxiliary motor becomes ineffective for resisting movement of the brake treadle for the foot application of the brakes.

A further object is to provide such an apparatus having an auxiliary motor of the vacuum type provided with a vacuum chamber connected to the variable pressure chamber of a normally vacuum suspended booster motor to derive vacuum from such chamber whereby, if the brakes are operated with the accelerator pedal moved away from idling position, or if the control valve for the auxiliary motor should fail for any reason, the added resistance to movement of the brake pedal will progressively decrease as progressive energization of the booster motor takes place through the admission of air into the variable pressure chamber of the booster motor.

Other objects and advantages in the invention will become apparent during the course of the following description.

In the drawing I have shown one embodiment of the invention. In this showing:

Figure 1 is a side elevation of the system, parts being shown in section and parts being shown diagrammatically; and Figure 2 is an enlarged sectional view of the solenoid control valve for the auxiliary motor.

It will become apparent that the present invention is not limited in its use to any particular type of fluid pressure operated booster motor. The mechanism, for the sake of illustration, has been shown in conjunction with a vacuum booster of the type shown in the copending application of David T. Ayers, Jr., Serial No. 395,405, filed December 1, 1953. This motor therefore forms the subject matter of the pending application referred to and forms no part per se of the present invention.

The motor is indicated by the numeral 10 and comprises casing sections 11 and 12, the former of which carries a master cylinder 13 in which is operative a plunger 14 for displacing fluid into the wheel cylinders, as will be apparent.

Within the motor is arranged a fluid pressure responsive unit indicated as a whole by the numeral 15 and comprising a preferably cast body 16 against one side of which is clamped, in a manner to be described, a stamped metal plate 17 securing in position the inner periphery of a flexible diaphragm 18. The outer periphery of this diaphragm is clamped between the casing sections 11 and 12 in any desired manner.

To the casting 16 is fixed a sleeve 20 having a plurality of ports 21, 22 and 23 for a purpose to be described. The port 22 communicates with a vacuum chamber 24 through a port 25 formed in a collar 26 fixed to the sleeve 20. The chamber 24 is formed between the members 16 and 17 and communicates through an elbow 27 with a flexible hose 28 connected to a suitable source of vacuum such as the intake manifold of the motor vehicle engine.

A valve 30 is slidable in the sleeve 20 and is provided with a plurality of grooves 31, 32 and 33 adapted for communication respectively with the ports 21, 22, and 23. The groove 32 is elongated longitudinally of the valve 30 and has its remote ends spaced apart a distance approximately equal to the distance between the adjacent limits of the ports 21 and 22. When the valve 30 is in the lap position shown in Figure 1, with the parts in off position, there will be no communication between any port 21, 22, and 23 and its associated port of the valve 30. Under such conditions, as disclosed in the copending application referred to, vacuum will exist in both motor chambers 36 and 37 with the pressure in chamber 36 slightly higher than in the chamber 37 to bias the unit 15 to the off position shown in Figure 1. While the degree of vacuum in the chamber 36 thus varies, the variation is extremely slight, and accordingly this may be considered to be the constant pressure chamber of the booster motor. On the other hand, the chamber 37 is a variable pressure chamber in that it varies in pressure substantially from full manifold vacuum to atmospheric pressure between the off and fully applied positions of the brakes.

A cap 40 is fixed to the body 16 by bolts 41 one of which has a passage 42 communicating with the chamber 37, and communicating through a port 43 with a chamber 44 formed between the cap 40 and a control diaphragm 45 the inner periphery of which is fixed to the valve 30 by a plate 46. Springs 47 bias the plate 46 and hence the valve 30 toward the left as viewed in Figure 1.

The diaphragm 45 forms with the member 16 a chamber 48 which communicates with the motor chamber 36 through a passage 49. It will be apparent that pressures in chambers 36 and 48 are always equal and that the same is true of pressures in chambers 37 and 44. The cap 40 carries the fluid displacing plunger 14 which moves into the master cylinder 13 as previously stated.

A casing 52 is fixed in any suitable manner to the adjacent casing section 12 and contains an air cleaner 53 supplied with air through a nipple 54. From the interior of the air cleaner 53 air flows into annular space 55, thence to the left through a boot 56' which is connected at its left-hand end to an operating rod 56 the inner end of which extends into the valve 30 to actuate it. The left-hand end of the sleeve 20 terminates at a point spaced from the left-hand end of the boot 56', and accordingly air flows into the interior of the valve 30 and thence through ports 57 and 58 into the grooves 31 and 33 respectively. These two grooves therefore are always under atmospheric pressure.

The rod 56 is connected at its outer or left-hand end, as at 60, to the lower end of a brake lever 61 pivoted intermediate its ends in any suitable manner, as at 62, and carrying a pedal pad 63 at its upper end.

In the driver's position in the motor vehicle the pedal pad 63 is arranged to the left of and preferably substantially at the same level as the conventional accelerator pedal 64 forming a part of the throttle control mechanism of the vehicle engine and connected to the carburetor throttle valve through suitable connections including a rod 65. The accelerator pedal in the present instance is provided with a depending arm 67 carrying a switch element 68 engageable with a stationary switch element 69 for a purpose to be described.

An auxiliary motor 72 is adapted to provide additional force tending to hold the brake pedal in normal off position when the accelerator pedal 64 is moved from idling position. The auxiliary motor comprises casing sections 73 and 74 between which is secured the periphery of a diaphragm 75. A rod 76 is connected axially to the diaphragm 75 and projects through an opening 77 in the casing section 73 and accordingly the associated chamber 78 of the auxiliary motor is always at atmospheric pressure. The other chamber 79 of the auxiliary motor is sealed to the atmosphere and is pressure-controlled in a manner to be described.

The free end of the rod 76 is slotted as at 82 to receive a pin 83 connected to the brake pedal 61 preferably a relatively short distance below the pivot 62. The slotted end of the rod 76 is connected to one end of a spring 84 the other end of which is connected to a bracket 85 fixed in position to any suitable portion of the vehicle.

A control valve device indicated as a whole by the numeral 88 is adapted to control pressures in the auxiliary motor chamber 79. The valve device 88 comprises a valve body 89 having a pair of chambers 90 and 91 therein, the latter of which is closed by plate 92. The chambers 90 and 91 have a passage 93 extending therebetween and provided with upper and lower valve seats 94 and 95 engageable respectively by resilient valves 96 and 97 carried by a stem 98.

The chamber 90 communicates with the atmosphere through a port 100. The passage 93 communicates with a port 101 to which is connected one end of a pipe 102 leading to the chamber 79. The chamber 91 communicates through a port 104 with one end of a pipe 105 connected to the variable pressure motor chamber 37.

A solenoid 106 is arranged above the valve body 89 and is carried within a housing 107 forming a closure for the top of the chamber 90. An armature 108 is vertically movable in the solenoid 106 and is connected at its lower end to the stem 98. A spring 109 urges the armature 108 downwardly, thus biasing the valve 96 to closed position and the valve 97 to open position. Energization of the solenoid in a manner to be described then reverses the valves 96 and 97, the former being opened and the latter closed. One terminal of the solenoid 106 is connected to one end of a wire 112 leading to the stationary contact 69. The other terminal of the solenoid leads through a wire 113 to the vehicle ignition switch 114 and thence to the vehicle battery 115, the second terminal of which is grounded as at 116.

*Operation*

Assuming that the parts are in the positions shown in Figure 1, with the accelerator pedal 64 moved at least a sufficient distance from idling position to open the switch 67, the parts of the valve device 88 will occupy the positions shown in Figure 2. The circuit through the solenoid 106 being opened, the valve 96 will close communication between the chamber 90 and passage 93. The valve 97 will open communication between the chamber 91 and passage 93, thus connecting ports 101 and 104 and establishing communication between the auxiliary motor chamber 79 and the variable pressure booster motor chamber 37, in which vacuum will be present. Under such conditions, the diaphragm 75 will occupy the position shown in Figure 1 and the pin 83 will be arranged in the right-hand end of the slot 82. The operator thus may rest his left foot on the pedal pad 63, and differential pressures in the motor 72 will prevent the brake pedal from being moved from the normal off position. Without the auxiliary motor, the only resistance to movement of the brake pedal will be in light biasing means such as the springs 47, in which case the weight of the operator's foot is sufficient to move the brake pedal from the normal completely off position, and at least a slight brake application will occur, as will become apparent.

Assuming that the operator desires to apply the brakes, he will release the accelerator pedal before applying pressure to the pedal pad 63. The releasing of the accelerator pedal obviously closes a circuit through the solenoid 106, and the armature 108 will move upwardly to open the valve 96 and close the valve 97. The port 101, and consequently the auxiliary motor chamber 79, will now be disconnected from the valve chamber 91 and will communicate with the valve chamber 90 which is open to the atmosphere through port 100. The releasing of the accelerator pedal, accordingly, instantly deenergizes the auxiliary motor whereupon the spring 84 pulls the slotted end of the rod 76 toward the right in Figure 1, and the brake pedal and associated parts become operative in accordance with regular practice.

When the pedal pad is depressed, the rod 56 moves toward the right to open the groove 33 to the port 23 and thus admit air into the variable pressure chamber 37. At the same time, the center valve groove 32 will open at its right-hand end to the port 21 thus connecting the chamber 48 to the vacuum chamber 24. Since the chamber 48 communicates with the motor chamber 36, this chamber will be maintained in communication with the source of vacuum. Increased pressure in the chamber 37 will move the pressure responsive unit 15 toward the right, and the plunger 14 will displace fluid from the master cylinder into the brake lines.

Initial movement of the brake pedal takes place solely against the tension of the light springs 47, thus providing the highly desirable "soft" pedal. As the motor becomes energized, pressure in the chamber 44, corresponding to pressure in the motor chambre 37, will act against the diaphragm 45 to oppose movement of the valve 30 in accordance with the degree of energization of the booster motor. Vacuum conditions will remain in the chamber 48, as will be apparent. This reaction forms per se no part of the present invention, nor does any structural or operational characteristic of the booster motor affect the present invention, except that it is preferred that the pipe 105 be connected to the variable pressure chamber of whatever type of booster mechanism is employed for operating the brakes, for a reason discussed below.

It will be apparent that the pipe 105 can be directly connected to the intake manifold, in which case full vacuum under all conditions will exist in the valve chamber 91, and the auxiliary motor 72 will operate in the manner discussed above. It is preferred, however, that the pipe 105 be connected to the variable pressure chamber of the booster motor. In the event the operator should maintain the accelerator pedal slightly depressed to break the solenoid circuit at contacts 68 and 69 when applying the brakes, the auxiliary motor 72 will resist movement of the brake pedal, but this will merely provide a "harder" initial pedal.

The force applied to the brake pedal will energize the booster motor in the manner described, and pressures in the booster motor chamber 37 will rise progressively during brake application, and pressures in the auxiliary motor chamber will progressively rise, thus correspondingly reducing false resistance against movement of the brake pedal 63. While the apparatus is fully operative with the pipe 105 connected directly to the source of vacuum, operation of the brake pedal with the solenoid circuit broken would render the brake pedal operative again substantial and uniform false resistance throughout movement of the booster motor parts. From the broad standpoint, the variable pressure motor chamber 37 may be considered to be a source of pressure differential for operating the auxiliary motor 72, and a much better operation under the unusual conditions referred to is effected by connecting the pipe 105 to the chamber 37 to be subjected to the variable pressures therein.

There is a second reason which renders it advisable to connect the pipe 105 to the booster motor chamber 37. Assuming that one of the wires associated with the solenoid 106 should break, or there should be a separation of any of these wires from its associated contacts or other elements, the solenoid 106 would remain de-energized, and regardless of the position of the accelerator pedal, the auxiliary motor chamber 79 would remain in communication with the booster motor chamber 37. If the accelerator pedal should then be released, the operation will be identical with that described above for the conditions wherein the brake pedal is operated with the accelerator pedal slightly depressed. There would be substantial false initial resistance to movement of the brake pedal from its normal off position, but this resistance would progressively decrease as pressures in the motor chamber 37 increase.

It will be apparent that the pin 83 is connected to the brake pedal relatively close to the pedal pivot axis 62. It also will be apparent that a relatively small auxiliary motor 72 will be employed. It is intended that the force thus applied to the brake pedal to bias it to its normal off position should not be too great, but only slightly more than sufficient to support the weight of the operator's left foot on the pedal pad 63 to provide a rest for the foot in the normal driving of the vehicle. Therefore, if the brake pedal is operated with the motor 72 energized, the opposing false resistance to movement of the brake pedal is not great enough to be substantially objectionable. While this would interfere somewhat with the "feel" in the brake pedal, the false resistance will decrease as brake application progresses because of the progressive rise in pressure in the booster motor chamber 37.

It is to be understood that the form of the invention shown and described is for the purpose of illustration and that the scope of the invention is defined in the appended claims.

I claim:

1. In combination, a brake booster mechanism comprising a fluid pressure responsive motor, a control valve mechanism therefor and pedal means having a normal off position from which it is movable to operate said valve mechanism and energize said booster motor, a vehicle engine accelerator pedal having a normal idling position, an auxiliary motor connected to said pedal means, and accelerator pedal controlled means operatively connected to said auxiliary motor for effecting energization of said auxiliary motor when said accelerator pedal is not in said normal idling position, to resist movement of said pedal means from its normal off position, said accelerator pedal controlled means, when said accelerator pedal is in its normal idling position, rendering said auxiliary motor ineffective to affect movement of said pedal means.

2. The combination defined in claim 1 wherein said auxiliary motor is of the differential fluid pressure type having a pressure responsive member connected to said pedal means, said means for effecting energization of said auxiliary motor comprising a valve device biased to a position connecting said auxiliary motor to a source of pressure differential, and means operable by said accelerator pedal when the latter is not in said normal idling position for moving said valve device to disconnect said auxiliary motor from said source and connect it to the atmosphere.

3. The combination defined in claim 1 wherein said auxiliary motor is of the differential fluid pressure type having a pressure responsive member connected to said pedal means, said means for effecting energization of said auxiliary motor comprising a valve device biased to a position connecting said auxiliary motor to a source of pressure differential, a solenoid having an armature connected to said valve device, and a circuit for said solenoid including a stationary switch element and a movable switch element connected to said accelerator pedal and engaging said stationary switch element when said accelerator pedal is in said normal idling position.

4. In combination, a booster brake mechanism comprising a booster motor having a pressure responsive unit therein dividing it into a relatively constant pressure chamber and a variable pressure chamber, valve mechanism for said booster motor, pedal means connected to said valve mechanism and movable from a normal off position to energize said booster motor, an auxiliary fluid motor having a pressure responsive unit connected to said pedal means and energizable by differential pressure in said variable pressure chamber to oppose movement of said pedal means from a normal off position, an accelerator pedal having a normal idling position, and accelerator pedal controlled means operatively connected between said variable pressure chamber and said auxiliary motor, said pedal controlled means including control portions for preventing communication between said variable pressure chamber and said auxiliary motor when said pedal means is operated during a first condition of said accelerator pedal whereby said auxiliary motor offers no resistance to movement thereof, and in which said control portions permit communication between said variable pressure chamber and auxiliary motor during a second condition of said accelerator pedal.

5. In combination, in booster brake mechanism comprising a booster motor having a pressure responsive unit therein dividing it into a relatively constant pressure chamber and a variable pressure chamber, valve mechanism for said booster motor, pedal means connected to said valve mechanism and movable from a normal off position to energize said booster motor, an auxiliary fluid motor having a pressure responsive member therein dividing it into a pair of chambers one of which is open to the atmosphere and the other of which is connected to a conduit communicating with said variable pressure chamber to be energized by pressure in the latter chamber to oppose movement of said pedal means from said normal off position, said pressure responsive member being biased to a position in which it is inoperative for opposing movement of said pedal means, an accelerator pedal having a normal idling position, and an accelerator pedal controlled valve in said conduit for energizing said auxiliary motor when said accelerator pedal is not in said idle position, and de-energizing said auxiliary motor when said accelerator pedal is in said idle position.

6. In combination, a vehicle booster brake mechanism comprising a fluid motor having a pressure responsive unit therein dividing it to form a constant pressure chamber and a variable pressure chamber, a valve mechanism for controlling relative pressures in said motor chambers, pedal means connected to said valve mechanism and movable from a normal off position to effect energization of said booster motor, an accelerator pedal having a normal idling position, an auxiliary fluid motor having a pressure responsive member connected to said pedal means and dividing said auxiliary motor to form a pair of chambers one of which is open to the atmosphere, and accelerator pedal-operated auxiliary valve means connecting the other chamber of said auxiliary motor to said variable pressure chamber to energize said auxiliary motor and oppose movement of said pedal means from said normal off position when said accelerator pedal is moved away from said normal idling position and for connecting said other chamber to the atmosphere, when said accelerator pedal is in said normal idling position, for rendering said auxiliary motor ineffective for opposing movement of said pedal means from said normal off position.

7. The combination defined in claim 6 wherein said auxiliary valve means comprises a solenoid and a valve operable thereby, and a circuit for said solenoid including a switch operable by said accelerator pedal.

8. The combination defined in claim 6 wherein said auxiliary valve means comprises a solenoid and a valve operable thereby, and a circuit for said solenoid comprising a switch connected to the accelerator pedal and movable to closed position when said accelerator pedal is in said normal idling position for energizing said solenoid to open said other chamber to the atmosphere.

9. A booster brake mechanism comprising a booster motor, pedal means connected to said motor and movable from a normal off position to energize said booster motor, an auxiliary motor having a power-movable member, a rod connected to such member and having a slot therein, a pin carried by said pedal means and engageable in said slot, said pin, when said auxiliary motor is energized, being arranged in the end of said slot corresponding to the direction of movement of said pin when said pedal means is moved from said normal off position, an accelerator pedal having a normal idling position, means biasing said rod for movement of the other end of said slot toward said pin, and means operatively connected between said booster motor and said auxiliary motor for controlling energization of said auxiliary motor in response to the position of said accelerator pedal disposed in its normal idle position or when moved therefrom.

10. In combination, a booster brake mechanism comprising a booster motor, pedal means connected to said motor and movable from a normal off position to energize said motor, an accelerator pedal, an auxiliary fluid motor having a pressure responsive member therein dividing it into a pair of chambers one of which communicates with the atmosphere, a rod carried by said pressure responsive member and having a slot therein, a pin carried by said pedal means and engaging in said slot, and means rendered operative by said accelerator pedal when the latter is not in normal idling position for connecting said other auxiliary motor chamber to a source of pressure differential to energize said auxiliary motor, said pin, when said auxiliary motor is energized, being arranged in the end of said slot corresponding to the direction of movement of said pin when said pedal means is moved from its normal off position whereby energization of said auxiliary motor will oppose such movement of said pedal means.

11. The combination defined in claim 10 wherein the means for connecting said other chamber to said source comprises a three-way valve biased to a position connecting said other chamber to said source and movable to a second position connecting said other chamber to the atmosphere, a solenoid energizable for moving said three-way valve to said second position, and a circuit for said solenoid comprising a switch closed when said accelerator pedal is in said normal idling position.

12. The combination defined in claim 10 wherein said booster motor is a vacuum motor having a pressure responsive unit dividing it to form a relatively constant pressure chamber and a variable pressure chamber, said variable pressure chamber constituting said source of pressure differential for said auxiliary motor.

References Cited in the file of this patent

UNITED STATES PATENTS

| 1,865,817 | Berry | July 5, 1932 |
| 2,037,869 | Wall | Apr. 21, 1936 |
| 2,079,409 | Hunt | May 4, 1937 |
| 2,208,282 | Shelor | July 16, 1940 |
| 2,311,120 | Mossinghoff | Feb. 16, 1943 |
| 2,365,960 | Ingres | Dec. 26, 1944 |
| 2,464,327 | Mack | Mar. 15, 1949 |
| 2,657,778 | Nallinger | Nov. 3, 1953 |

FOREIGN PATENTS

| 25,687 | France | Jan. 23, 1923 |